United States Patent
Hayashida

[11] 3,949,846
[45] Apr. 13, 1976

[54] PLURAL ACTUATOR FOR DISC BRAKES

[75] Inventor: Yoshihiro Hayashida, Chigasaki, Japan

[73] Assignee: Tokico Ltd., Japan

[22] Filed: Aug. 6, 1974

[21] Appl. No.: 495,539

[30] Foreign Application Priority Data
Aug. 20, 1973   Japan............................ 48-93141
Aug. 20, 1973   Japan............................ 48-93142

[52] U.S. Cl................ 188/345; 92/111; 188/106 P
[51] Int. Cl.2 ........................................ B60T 11/24
[58] Field of Search.............. 188/106 P, 345, 72.4; 92/110, 111; 85/8.8

[56] References Cited
UNITED STATES PATENTS

| | | |
|---|---|---|
| 3,312,313 | 4/1967 | Moyer .................. 188/106 P |
| 3,359,021 | 12/1967 | Wurzel et al. ............. 85/8.8 X |
| 3,403,602 | 10/1968 | Brandon, Jr. ............. 188/345 X |
| 3,483,789 | 12/1969 | Wurzel ..................... 85/8.8 |
| 3,517,782 | 6/1970 | Hayes ...................... 188/345 |
| 3,804,212 | 4/1974 | Haraikawa ............... 188/345 X |

Primary Examiner—George E. A. Halvosa
Attorney, Agent, or Firm—Wenderoth, Lind & Ponack

[57] ABSTRACT

There is disclosed a hydraulic pressure system disc brake which comprises a caliper having a groove large enough to pass the circumferential portion of brake disc therethrough, and a hollow cylinder extending in a direction at a right angle to the aforesaid groove. A flanged cylindrical member is disposed within the hollow cylinder. A cup-shaped piston is fitted in an annular space defined by the aforesaid caliper and cylindrical member.

6 Claims, 6 Drawing Figures

3,949,846

PLURAL ACTUATOR FOR DISC BRAKES

BACKGROUND OF THE INVENTION

This invention relates to a disc brake.

A disc brake is known, in which a brake disc is held through the medium of brake pads between one arm of caliper and a piston shifted due to hydraulic pressure from a dual system.

Some of the disc brakes of this type are so constructed that the piston and the cylindrical member serving to guide the piston define two oil chambers, into each of which hydraulic pressure is introduced from separately provided hydraulic pressure systems. The present invention is directed to improvements in a disc brake of this type.

In a disc brake of this type, in the event that pressure in one of the hydraulic systems fails to increase due to trouble in the hydraulic system, a force will act on the cylindrical member in a direction moving the cylindrical member from the bottom wall face of the cylinder. In this connection, the disc brake of the prior art involves the problem of the necessity of providing a locking construction for the cylindrical member, such locking construction often failing for lack of strength.

Furthermore, in the disc brake of the conventional type a locking ring fits in an annular groove provided in the side wall of the cylinder. It is troublesome to manufacture these parts and to assemble the same. In addition, in replacing a broken seal there is risk of scratching the inner wall of the cylinder, which might impair the sliding motion of the piston in the cylinder.

SUMMARY OF THE INVENTION

It is accordingly an object of the present invention to provide a disc brake, which comprises a locking construction for a cylindrical member improved in strength and easy to manufacture as well as to assemble.

A further object of the present invention is to provide a disc brake in which fluid pressures in both of two fluid chambers formed inside and outside of the cylindrical member press the cylindrical member only in a direction toward the closed bottom wall of the cylinder, thereby preventing the cylindrical member from moving in the direction of movement of the piston.

Thus, according to the present invention, when operating with either both fluid pressure sources or only one of them, the cylinder member is pushed to the inside bottom wall of the cylinder. Therefore, it is not mandatory to provide a specific stopper.

Other objects and features of the present invention will be apparent from a reading of the ensuing part of the specification in conjunction with the accompanying drawings which indicate preferred embodiments of the invention.

DETAILED DESCRIPTION OF THE INVENTION

Figure 1:
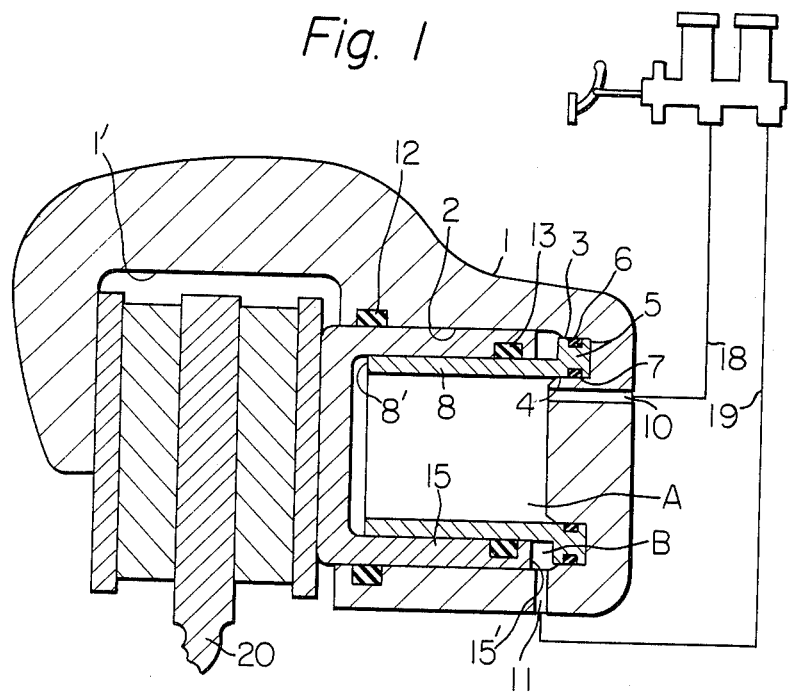
FIG. 1 is a longitudinal cross-sectional view showing a preferred embodiment of the presesent invention.

Referring first to FIG. 1, a caliper 1 is provided with a groove 1' large enough to pass the circumferential portion of brake disc 20 therethrough, and a hollow cylinder 2 extending in a direction perpendicular to the groove 1' and having an opening leading to the side of groove 1'. Cup-shaped piston 15 is slidably fitted in the hollow cylinder 2. An annular groove is defined between the cylindrical inner peripheral walls 3 and 4 of hollow cylinder 2, in the blocked bottom portion thereof. A cylindrical member 8 has a flange 5 projecting radially outwardly of the outer peripheral surface thereof, and is disposed within the hollow cylinder 2 coaxially therewith, with its flange fitted in the aforesaid annular groove. The outer peripheral surface of cylindrical member 8 is in contacting relation to the inner peripheral wall of cup-shaped piston 15, which in turn is fitted over the cylindrical member 8. The flange 5 of cylindrical member 8 should be fitted in the annular groove in a manner to leave an interstice therebetween sufficient to accommodate the minor eccentricity of the cylindrical member 8 and the piston 15 with respect to the hollow cylinder, which minor eccentricity may be experienced when those members are mounted in the hollow cylinder 2. The flange 5 is provided with a slot in the outer and inner peripheral walls thereof, respectively, in which are fitted seals 6 and 7 such as O-rings, respectively, thereby providing liquid-tightness between the flange 5 and the peripheral wall 3 of hollow cylinder, and between the flange 5 and the peripheral wall 4, respectively. Seals are shown at 12 and 13.

A feature of the present invention is that the inside diameter of the seal 7 fitted between the cylindrical member and the cylinder is less than the inside diameter of the seal 13 fitted between the inner peripheral surface of the piston and the outer peripheral wall surface of the cylindrical member.

The caliper 1 includes a first liquid pressure passage 18 communicating with a first oil chamber A defined by the hollow cylinder 2, the inner peripheral wall of cylindrical member 8 and the inner peripheral wall of piston 15, and a second liquid pressure passage 19 communicating with a second oil chamber B defined by the hollow cylinder 2, the outer peripheral surface of cylindrical member 8 and the rear end face 15' of piston 15. First and second liquid slots, 10 and 11, are provided in the cylinder of caliper 1.

If pressurized oil is introduced in the first and second oil chambers A and B, then in the second oil chamber B, the cylindrical member 8 receives a force in its annular portion which projects radially of the flange thereof, whereby the cylindrical member 8 will be forced towards the wall of blocked bottom of cylinder 2. Owing to the above-described force, coupled with a frictional force of a seal 13 fitted between the piston 15 and the cylindrical member 8, which frictional force is produced when the piston 15 is shifted leftwards as viewed in FIG. 1 due to oil pressure from the first and second oil passages, the cylindrical member is maintained in a condition of being urged against the bottom wall of cylinder, without being shifted leftwards along with the leftwardly moving piston 15. Meanwhile, in the first oil chamber A, the cylindrical member 8 will receive oil pressure in an annular end face 8' thereof and will be forced towards the blocked bottom wall of cylinder, whereby the leftward motion of the cylindrical member is completely prevented in like manner. Thus, in the event that no pressure rise takes place either in the first or in the second systems, such does not impair the tendency of the cylindrical member to be urged against the peripheral face of blocked bottom of cylinder 2, and hence there is no risk that the cylindrical member is detached from the bottom wall face of cylinder 2. This advantage is due to the structural relationship due to the relative positions of the elements resulting from seal 7 being smaller than seal 13. Specifically, it is impossible for any pressure fluid to act on cylindrical member 8 to move the same to the left in FIG. 1.

Figure 2:
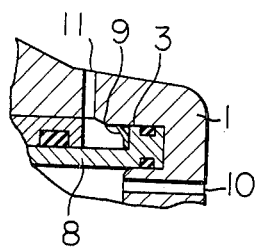
FIG. 2 is a fragmentary cross-sectional view showing another embodiment of the present invention, in which a retainer is incorporated.
Figure 3:
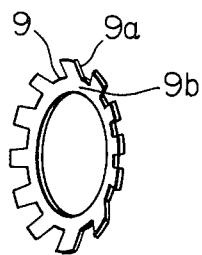
FIG. 3 is a perspective view of the retainer of FIG. 2.

FIG. 2 shows another embodiment of the present invention, in which a retainer is incorporated. To prevent an unwanted shifting of the cylindrical member 8 from the blocked bottom of cylinder 2 due to vibration, etc., when no hydraulic pressure is applied to the cylindrical member 8, a retainer 9, as best seen in FIG. 3, is inserted between the annular wall surface 3 of annular groove and the cylindrical member 8. The retainer has a plurality of pawls 9a extending radially outwardly of a circular portion 9b in a manner to be bent obliquely, the plurality of pawls 9a serving to secure the retainer 9 to the annular wall face 3 of annular groove.

Figure 4:
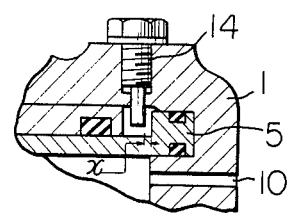
FIG. 4 is a fragmentary cross-sectional view of a further embodiment of the present invention, in which a stopper is incorporated.

FIG. 4 shows a further embodiment of the present invention, in which a stopper is incorporated. The stopper 14 is threaded in the caliper 1 from outside of caliper 1, with the tip portion thereof located frontwards of the outer peripheral, projecting portion of flange 5 of cylindrical member 8. The stopper 14 need not contact the outer peripheral, projecting portion of flange 5, but should preferably be disposed in such a manner as to leave therebetween an interstice x adequate to accommodate a processing error of the cylinder 2, piston 15 and cylindrical member 8. The interstice x should fall within such an extent that would not cause the seals 6 and 7 to slip off the cylindrical peripheral walls 3 and 4 of annular slot.

Figure 5:
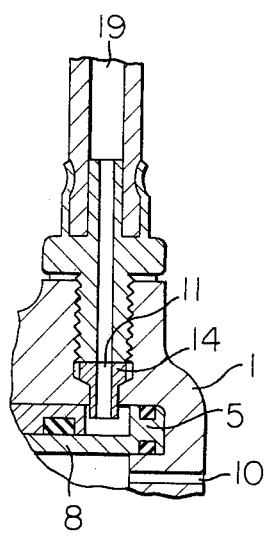
FIG. 5 is a fragmentary cross-sectional view of a still further embodiment of the present invention, which includes a stopper serving as part of a second liquid pressure passage as well; and, FIG. 6 is a fragmentary cross-sectional view of a still further embodiment of the present invention, in which there are provided a stopper serving as part of a second liquid pressure passage, a spring washer and a washer.

Referring to FIG. 5 showing a further embodiment of the present invention, in which the stopper serves as part of the second liquid pressure passage, the stopper 14 has an axially running through-hole 11, which serves as part of the second liquid pressure passage 19 communicating with the second oil chamber B.

Figure 6:
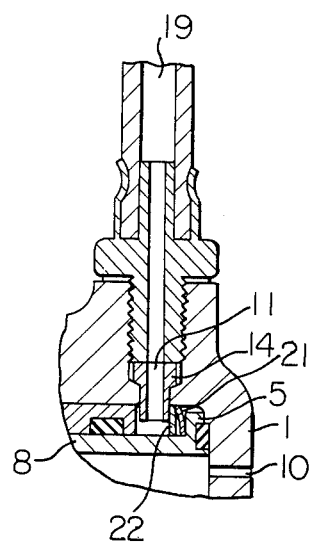

In FIG. 6, there is shown a still further embodiment which includes the stopper serving as the second liquid pressure passage shown in FIG. 5, a spring washer and washer. In this embodiment, a spring washer 21 and a washer 22 are disposed between the stopper 14 and the flange portion 5 of cylindrical member 8, whereby separation of the cylindrical member 8 from the bottom wall will be prevented completely.

As is apparent from the foregoing, either in the normal condition of the dual hydraulic pressure systems or in the case of defects in either of the systems, the cylindrical member 8 is maintained urged against the blocked bottom wall of cylindrical portion 2 under hydraulic pressure, without the use of any locking means. Where locking means is desired, a stopper which is simple in construction may be used. Since the flange of the cylindrical member does not slide relative to the annular groove, the flange of the cylindrical member may be fitted comparatively loosely in the annular groove. In addition, a manufacturing error may be compensated by the interstice left between the flange and the annular groove which are in fitting relation, so that high precision in manufacturing the piston 15, cylinder 2 and cylindrical member 8 is not required. This is advantageous from the viewpoints of manufacture of parts and assembly thereof and contributes to reduction in the manufacturing cost.

What is claimed is:

1. A disc brake comprising:

a caliper having therein a groove large enough to pass a circumferential portion of a brake disc therethrough;

a cylinder formed in said caliper and extending in a direction perpendicular to said groove, said cylinder having at a first end thereof an opening communicating with said groove, said cylinder having at a second end thereof a closed bottom face, said cylinder having an inner peripheral surface extending between said bottom face and said opening, said bottom face having formed therein an annular groove;

a cylindrical member positioned within said cylinder, said cylindrical member having at a first end thereof a flange extending radially outwardly thereof, said flange being positioned in said annular groove and maintained in contact with said bottom face of said cylinder, said cylindrical member having an inner peripheral wall surface and an outer peripheral wall surface, said outer peripheral wall surface being spaced from said inner peripheral surface of said cylinder and defining therewith an annular space;

a cup-shaped piston having a cylindrical wall slidably fitted in said annular space, said wall having an outer peripheral surface slidable relative to said inner peripheral surface of said cylinder and an inner peripheral surface slidable relative to said outer peripheral wall surface of said clyindrical member, said piston having a first closed end and a second open end having a ring-shaped face;

a first pressure fluid passage communicating with a first fluid chamber defined by said inner peripheral wall surface of said cylindrical member and said closed end of said piston;

a second pressure fluid passage communicating with a second fluid chamber defined by said inner peripheral surface of said cylinder, said outer peripheral wall surface of said cylindrical member, and said ring-shaped face of said piston;

a first annular seal positioned between said inner peripheral surface of said piston and said outer peripheral wall surface of said cylindrical member;

a second annular seal positioned within said annular groove, on said inner peripheral wall surface of said cylindrical member, and between said cylindrical member and said cylinder; and said first annular seal having an inside diameter greater than that of said second annular seal.

2. A disc brake as claimed in claim 1 further comprising a third annular seal positioned in said annular groove between said flange and said cylinder.

3. A disc brake as claimed in claim 1, further comprising an annular retainer having around the circumference thereof a plurality of pawls projecting radially outwardly therefrom, and said annular retainer being disposed adjacent said flange and providing means for preventing said cylindrical member from being detached from said bottom face of said cylinder.

4. A disc brake as claimed in claim 1, further comprising a stopper mounted in said caliper and having a lower tip projecting to a position adjacent said flange and providing means for preventing said cylindrical member from being detached from said bottom face of said cylinder.

5. A disc brake as claimed in claim 4, further comprising a through-hole extending axially through said stopper, said through-hole comprising a portion of said second pressure fluid passage.

6. A disc brake as claimed in claim 4, further comprising an annular spring washer and a washer positioned adjacent said stopper.

* * * * *